J. C. KIEL.
CULTIVATOR.
APPLICATION FILED MAY 23, 1910.
1,019,803.
Patented Mar. 12, 1912.
2 SHEETS—SHEET 1.
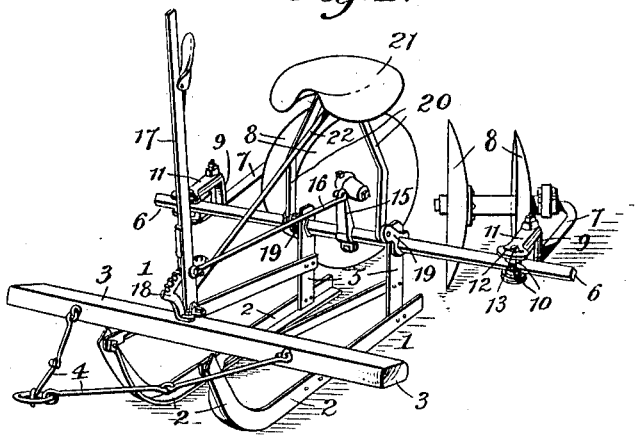
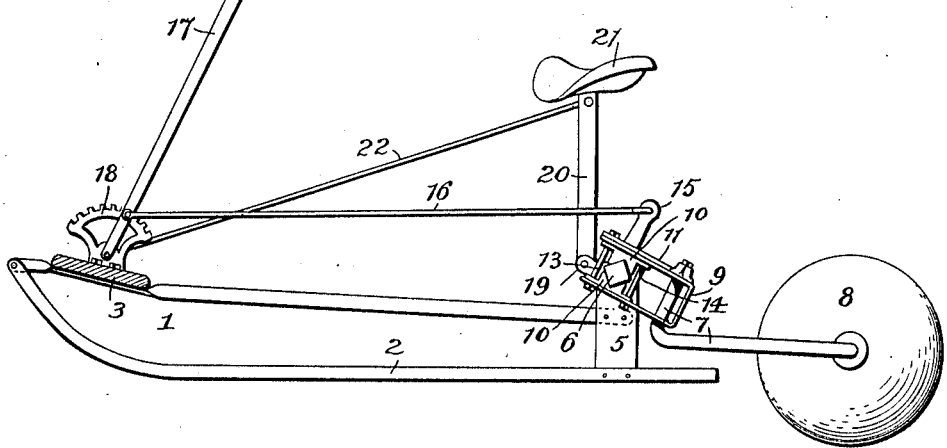
Witnesses:
Jas E Hutchinson
S. Jay Teller
Inventor:
John C. Kiel
By H H Bliss Attorney J. C. KIEL.
CULTIVATOR.
APPLICATION FILED MAY 23, 1910.
1,019,803.
Patented Mar. 12, 1912.
2 SHEETS—SHEET 2.
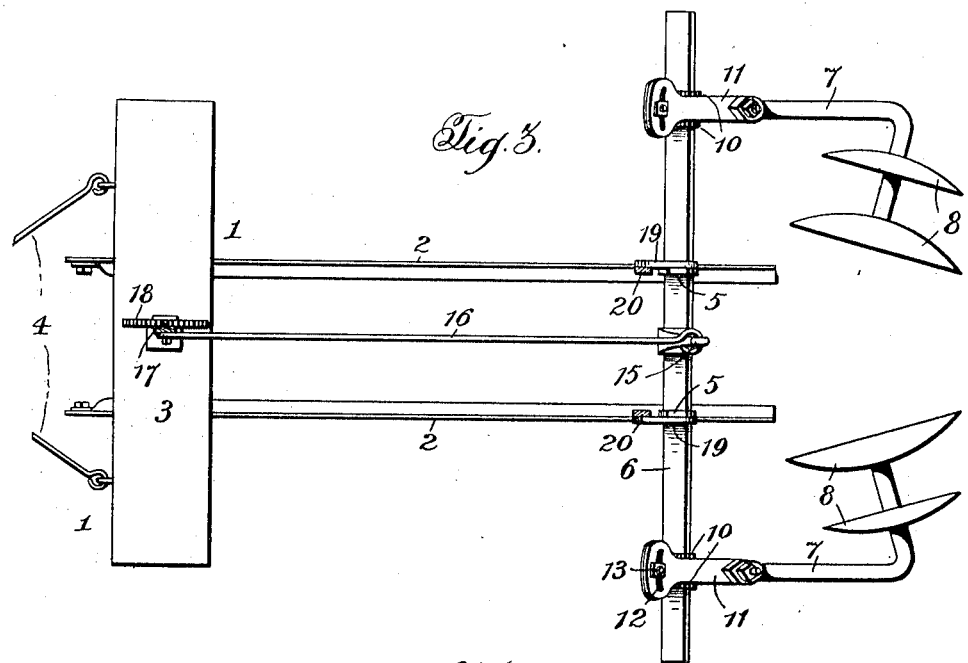
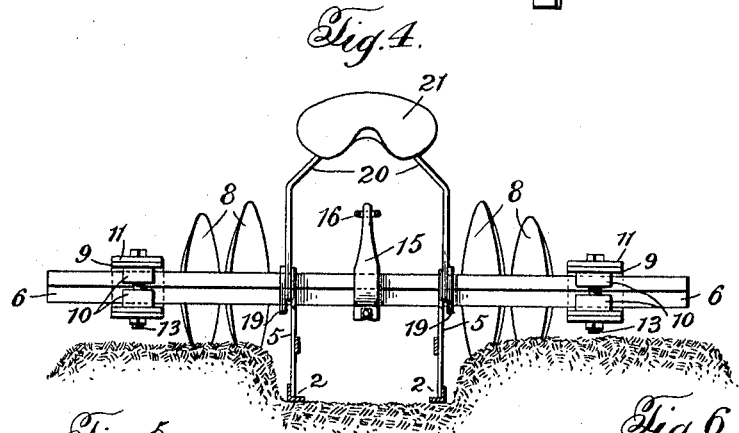
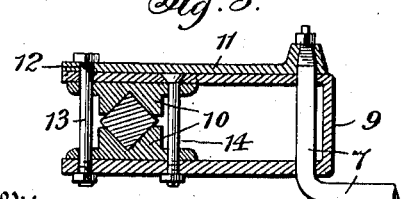
Witnesses:
Jas. E. Hutchinson
S. Jay Teller
Inventor
John C. Kiel
By H. H. Bliss, Attorney

UNITED STATES PATENT OFFICE.

JOHN C. KIEL, OF MOLINE, ILLINOIS, ASSIGNOR TO DEERE & COMPANY, OF MOLINE, ILLINOIS, A CORPORATION OF ILLINOIS.

CULTIVATOR.

1,019,803.  Specification of Letters Patent.  Patented Mar. 12, 1912.

Application filed May 23, 1910. Serial No. 562,875.

*To all whom it may concern:*

Be it known that I, JOHN C. KIEL, a citizen of the United States, residing at Moline, in the county of Rock Island and State of Illinois, have invented certain new and useful Improvements in Cultivators, of which the following is a specification, reference being had therein to the accompanying drawing.

This invention relates to lister cultivators of the type specially adapted for entirely breaking down the ridges between the furrows.

In certain localities, and under certain conditions, it is found desirable to cut down the ridges so as to leave the field practically level. It is for performing this class of work that a machine embodying my invention is especially adapted. It will be understood however that certain features of my invention are equally applicable to cultivators designed for other classes of work.

One object of my invention is to provide improved means for adjusting the vertical positions of the disks.

Other objects are to provide improved means for adjusting the angular and lateral positions of the disks.

Still further objects will appear from the following specification and the accompanying drawings.

Of the drawings which illustrate one embodiment of my invention, Figure 1 is a perspective view. Fig. 2 is a side elevation. Fig. 3 is a plan view. Fig. 4 is a cross sectional elevation taken from the front and showing the machine in operative position. Figs. 5 and 6 are enlarged detail views of the adjusting clamps for the disks.

Referring to the drawings, 1 represents as a whole the frame of the machine. This frame comprises the two parallel horizontal runners 2, 2, by means of which the machine is supported. At the forward end of the frame is a cross bar 3, to which is connected a draft device such as indicated by 4. It will be noted that the runners are formed of angle irons although this exact construction is not essential.

The draft bar or cross bar 3 is of sufficient length and is set at a proper angle to the horizontal to act as a device for crushing clods and for smoothing the ridges in advance of the disks. It also serves to smooth the furrow to a certain extent by breaking up any unusually large clods which may have fallen into it. This bar by its engagement with the ridges at the sides of the furrow serves as a partial support to prevent tipping and assists in regulating the work of the disks for uniform depth of action.

At the rear end of the frame are two upstanding brackets 5, 5, connected at their lower ends with the runners 2, 2. Apertures are provided in the upper ends of these brackets in which is rotatably mounted the transverse disk controlling bar or shaft 6. The bar or shaft 6 is preferably made square.

It will be noted that the disks and their connecting devices for each side of the machine are similar, and it will therefore be unnecessary to separately describe the parts for the two sides. Referring to the elements shown in the drawings on one side of the machine, 7 represents a rearward extending arm for the disks 8, 8. It will be noted that the arm 7 is bent at an acute angle toward the center of the machine and that it is upon this inward and forward extending portion of the arm, that the disks are rotatably mounted. The disks 8, 8 are of the form usually used in implements of this character and need not be here described in detail. They may be mounted upon the arm 7 by any usual or preferred means.

The forward end of the arm 7 is bent upward at right angles and passes through two alining apertures in opposite sides of the yoke 9. The yoke 9 is U-shaped and its forward ends embrace two angularly notched blocks 10, 10, which engage opposite corners of the bar 6. The blocks 10 are provided with shallow grooves for the reception of the side bars of the yoke 9.

The upper end of the upturned portion of the arm 7 is squared and engages with a squared aperture in the lever 11. The parts are held together by a nut engaging the reduced threaded end of the arm 7. At the forward end of the lever 11 is an arcuate slot 12. A bolt 13 passes through apertures in the forward ends of the lower part of the yoke 9, through apertured ears on the blocks 10 and through the slot 12. A similar bolt 14 having a countersunk head at its upper end passes through the two side parts of the yoke 9 and through ears on the blocks 10.

It will be noted that by loosening the nut on the upper end of the bolt 13, the lever 11, and with it the arm 7, may be adjusted to different angular positions relative to the cross bar 6, and in this way the positions of the disks may be changed. Lateral adjustment of the disks relative to the other parts of the machine may be effected by loosening both the bolts 13 and 14, or in fact by merely loosening the bolt 13. If desired sufficient clearance may be given about the bolt 14 to permit the releasing of the blocks 10 from rigid engagement with the bar 6 when the bolt is loosened. After the parts have been moved longitudinally of the bar 6, to their desired position, tightening the bolt 13, or both the bolts 13 and 14, securely clamps them.

It will be noted that the construction above described makes possible by the loosening of one or two bolts, not only angular adjustment but also lateral adjustment of the disks. Tightening the bolts secures the disks against either angular or lateral movement.

15 is an upstanding arm rigidly connected with the cross bar 6. At the upper end of the arm 15 is a forward extending link 16, which is connected with a hand lever 17. The hand lever is provided with a locking detent which engages with the notched segment 18. The hand lever and the notched segment are preferably mounted on the forward cross bar 3.

It will be noted that a movement of the hand lever will rock the shaft 6 and thereby either raise or lower the disks 8.

19, 19 are levers or arms rigidly connected with the bar 6 at points adjacent to the brackets 5, 5. These arms are located preferably at a forward acute angle relative to the arm 15. At the outer ends of the arms 19, 19 are pivotally connected the lower ends of the U-shaped seat support 20 upon which is mounted the seat 21. A brace 22 connects the upper end of the support 20 with the forward part of the machine.

It will be noted that the weight of the driver is carried upon the arms 19, 19 which are disposed on opposite sides of the bar 6 relative to the disks. Therefore the weight of the driver tends to counterbalance the weight of the disks and permits their easy vertical adjustment by means of the hand lever.

The disks 8, 8 engage the ridges on the opposite sides of the furrows and move the soil into the furrows. By means of the various adjustments which have been described the positions of the disks may be adapted to suit various depths of furrows, various distances between furrows and various conditions of the soil.

What I claim is:—

1. In a cultivator of the class described, the combination with a suitable frame and supporting devices therefor, of a transverse shaft rotatable with respect to the frame about an axis fixed in relation thereto, a locking hand lever, connections between the hand lever and the shaft, arms connected to the shaft and extending at angles thereto, soil working devices mounted upon the arms, a driver's seat vertically movable with respect to the frame, means for holding the seat against substantial horizontal movement with respect to the frame, other arms secured to the shaft and extending in directions opposite to the directions of the aforesaid arms, and a seat supporting connection between the said seat and the last said arms.

2. In a cultivator of the class described, the combination with a suitable frame and supporting devices therefor, of a transverse shaft rotatable with respect to the frame about an axis fixed in relation thereto, means for operating the shaft, oppositely extending arms rigidly connected with the shaft, soil working devices supported by one of said arms, and a driver's seat supported in part by the other of said arms, the seat being vertically movable with respect to the frame and held against substantial horizontal movement with respect to the frame.

3. In a cultivator of the class described, the combination with a suitable frame and supporting devices therefor, of a transverse shaft rotatable with respect to the frame about an axis fixed in relation thereto, rearward extending arms connected with the shaft, soil working disks mounted upon the arms, forward extending arms also connected with the said shaft, an upward extending seat support pivotally connected at its lower end with the said forward extending arms, a vertically movable seat on the support, a brace between the upper end of the support and the frame for holding the seat against horizontal movement with respect to the frame, an adjusting lever, and connections between the lever and the shaft.

4. In a cultivator of the class set forth, the combination of a frame comprising two parallel ground-engaging runners, brackets extending upward from the said runners near their rear ends, a transverse rock-shaft mounted in the said brackets, arms on the rock-shaft extending at angles therefrom, soil working devices on the said arms, other arms mounted on the rock shaft at points adjacent the said brackets, the said arms extending in the opposite direction from the first said arms, a vertically movable driver's seat and elements supporting the seat held against substantial horizontal movement at their upper ends and pivotally connected at their lower ends with the last said arms.

5. In a cultivator of the class described, the combination with a suitable frame and supporting devices therefor, of a transverse shaft rotatable with respect to the frame about an axis fixed in relation thereto, arms extending from the shaft at angles thereto, soil working devices on the arms, other arms extending from the shaft in a direction opposite to that of the first said arms, a vertically movable driver's seat, bars connected at their upper ends with the seat and pivotally connected at their lower ends with the last said arms, a brace connected at one end with the frame and serving to prevent substantial horizontal movement of the seat, and means separate from said seat supporting bars and the said arms for operating the shaft.

6. In a device of the class described, the combination of a main frame, supporting devices for the frame, a transverse adjustable shaft, a U-shaped yoke adapted to embrace and engage with the shaft at its forward ends, soil working disks, an arm to the rear end of which the disks are connected, the forward end of the arm being upturned and passing through suitable apertures in the rear end of the yoke, a lever connected with the upper end of the upturned part of the arm, and means for locking the lever in any one of a plurality of positions, substantially as described.

7. In a machine of the class described, the combination with suitable frame parts and supporting devices, of a transverse adjustable square shaft, a U-shaped yoke adapted to embrace and engage with the shaft, soil working disks, a disk supporting element pivotally connected intermediate its ends with the rear end of the yoke, and a bolt adapted to engage the two parts of the yoke and the forward end of the said disk-supporting element to clamp the yoke parts in engagement with the shaft, and to clamp the said element in engagement with the yoke, substantially as described.

In testimony whereof I affix my signature, in presence of two witnesses.

JOHN C. KIEL.

Witnesses:
Eugene L. Taylor,
Roy E. Anderson.

---

Copies of this patent may be obtained for five cents each, by addressing the "Commissioner of Patents, Washington, D. C."